July 16, 1946.  F. H. HAGNER  2,403,919
PORTABLE ANGLE-MEASURING DEVICE
Filed Oct. 25, 1941  2 Sheets-Sheet 1
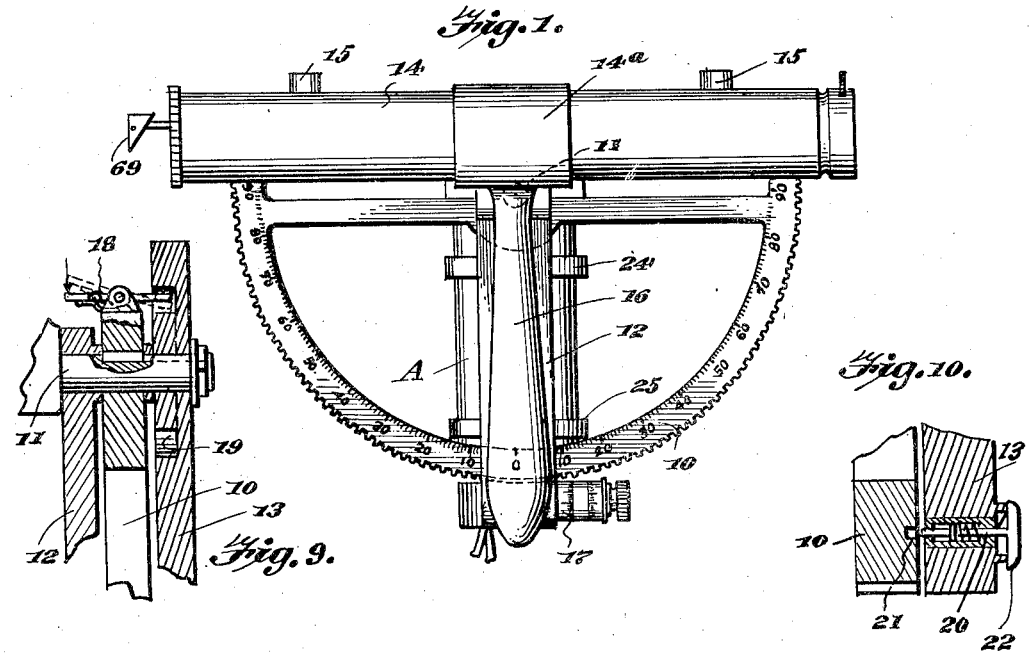
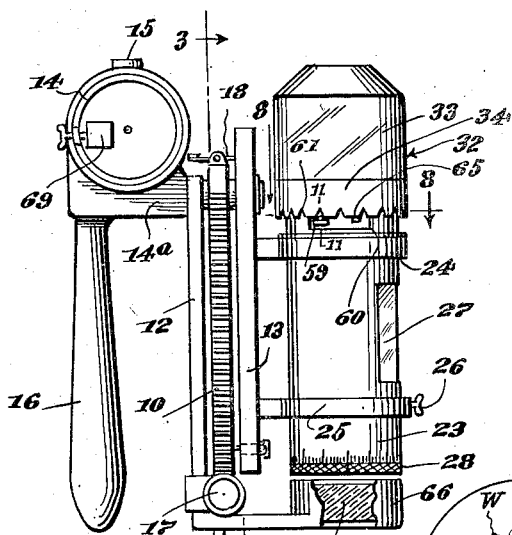
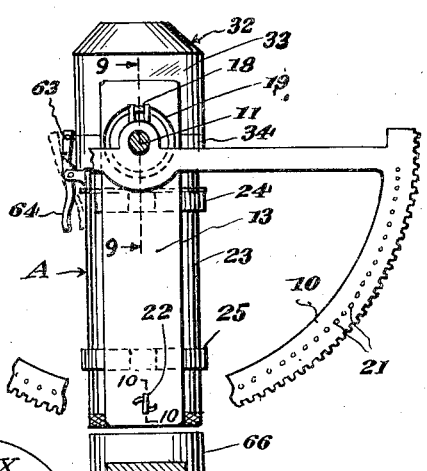
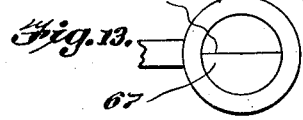
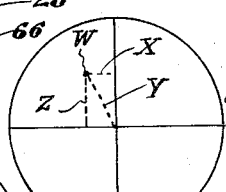
Inventor
FREDERICK H. HAGNER July 16, 1946.  F. H. HAGNER  2,403,919
PORTABLE ANGLE-MEASURING DEVICE
Filed Oct. 25, 1941  2 Sheets-Sheet 2
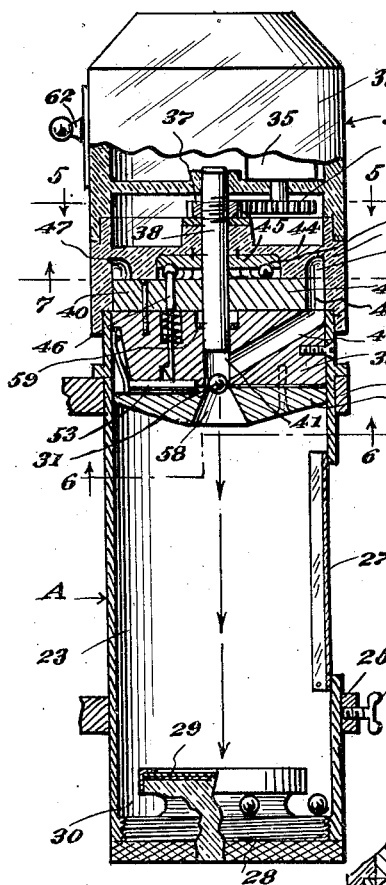
Inventor
FREDERICK H. HAGNER Patented July 16, 1946

2,403,919

UNITED STATES PATENT OFFICE 2,403,919

PORTABLE ANGLE-MEASURING DEVICE

Frederick H. Hagner, San Antonio, Tex., assignor to Archbold-Hagner Instrument Laboratory, Inc., a corporation of Delaware Application October 25, 1941, Serial No. 416,570

5 Claims. (Cl. 33—70)

This invention relates to a portable angle-measuring device, and has for one of its objects the production of a simple and efficient means for facilitating the measuring of angles in two directions while taking observations of a distant object.

A further object of this invention is the production of a simple and efficient missile-dropping unit for use with a sextant and sighting tube, which dropping unit is so constructed and operated as to record a series of observations and thereby enable the operator to determine the average angle of the sighting tube relative to the object observed during the period of observation.

Another object of this invention is the production of a simple and efficient missile-dropping unit which will automatically record a series of angle observations made over a selected period of time, thereby enabling an operator to determine the average angle of said observations.

Other objects and advantages of the present invention will appear throughout the following specification and claims.

In the drawings:

Figure 1 is a side elevational view of the portable range finder;

Figure 2 is a front elevational view;

Figure 3 is a vertical sectional view taken on line 3—3 of Figure 2;

Figure 4 is an enlarged vertical sectional view through the ball-dropping device, certain parts being shown in elevation;

Figure 5 is a horizontal sectional view taken on line 5—5 of Figure 4;

Figure 6 is a horizontal sectional view taken on line 6—6 of Figure 4;

Figure 7 is a horizontal sectional view taken on line 7—7 of Figure 4;

Figure 8 is a horizontal sectional view taken on line 8—8 of Figure 2;

Figure 9 is a vertical sectional view taken on line 9—9 of Figure 3;

Figure 10 is a vertical sectional view taken on line 10—10 of Figure 3;

Figure 11 is a fragmentary vertical sectional view taken on line 11—11 of Figure 8;

Figure 12 is an enlarged fragmentary vertical sectional view showing the ball-releasing needle in a retracted position;

Figure 13 is a bottom plan view of the reading device which is used for reading the impressions made upon the recording medium carried at the lower end of the angle-recording device;

Figure 14 is a top plan view of the recording cap;

Figure 15 is a top plan view of the disc which is carried by the magazine block;

Figure 16 is a diagram of the recording unit illustrating the measuring of three angles from one recording;

Figure 17 is a diagrammatic perspective view of the transparent disc carried by the reading device and illustrating the horizontal centering guide lines formed upon the top and bottom faces of the disc to eliminate parallax during reading.

By referring to the drawings, it will be seen that 10 designates an arc of 180°, which is keyed to a journal shaft 11. A hanger 12 is hung on the shaft 11 for swinging movement at one side of the arc 10, and a recording means supporting hanger 13 is loosely hung on the shaft 11 for swinging at the opposite side of the arc 10, as shown in Figure 2. A sighting tube 14 is mounted upon a carrier 14ª secured to one end of the shaft 11, and this tube 14 normally extends in a horizontal plane. This sighting tube 14 is a hollow tubular body similar to the sighting tube shown in my application Serial Number 368,698, filed December 5, 1940, relating to an observation and angle determining instrument, and does not employ lenses or other optical refinements. Abutment lugs 15 are formed on the top of the sighting tube 14 to permit the sighting tube 14 to be placed under an object to measure the inclination of said object. A handle 16 depends from the sighting tube carrier 14ª to facilitate holding of the device in the hand of an operator. The hanger 12 carries a micrometer screw 17 of the conventional type for releasably engaging the teeth formed on the arc 10. A spring-pressed brake shoe 18 extends transversely of the arc 10 and one end thereof extends into a circular channel 19 formed in the adjoining face of the hanger 13 for frictionally and releasably engaging one side of the channel 19 to hold the hanger 13 in a selected position. A spring-pressed locking plunger 20 is carried by the lower end of the hanger for engaging selected sockets 21 formed in the side of the arc 10. The plunger 20 is provided with a cam head 22 to cause the plunger 20 to be withdrawn from a selected socket 21 when the head 22 is rotated. The side edges of the hangers 12 and 13 will constitute points of reference with respect to the arc scale. Since each hanger is the equivalent of 16° in width as measured on the arc scale 10, it is only necessary to allow for a calculation of 8° to obtain a proper reading from 0 to the position of the side edge of the hanger or hangers relative to the arc scale 10. Also, when the hanger 13 is held in a selected position by the brake shoe 18 at the time of taking the reading, the micrometer screw 17 is at that time thrown into engagement with the scale arc 10, the micrometer reading zero. The brake shoe 18 is then released and the hanger 13 is swung by turning the micrometer until the plunger 20 registers in one of the sockets 21 opposite one of the 10° markings or multiple thereof on the scale, and the position of the socket 21 so engaged may be easily observed by the operator. Then by taking the reading on the micrometer in conjunction with the reading on the arc 10 opposite the selected socket 21, a reasonably accurate reading of the degree of swing relative to the true vertical is ascertained. The brake shoe 18 initially holds the hanger 13 in a sighted angular position until the plunger 20 engages the arc 10 to fixedly hold the hanger 13 in a set position.

An angle recording device A is supported to the side of the hanger 13 in an upright position, and is rotatably supported by the bands 24 and 25, which bands are carried by the hanger 13. A thumb-screw 26 is carried by the band 25 to hold the recording device A in a selected set position. The angle-recording device A comprises a tubular body 23 having a window 27 formed in one side thereof. A removable recording cap 28 of transparent material (Lucite) is fitted in the lower end of the tubular body. This recording cap 28 carries a suitable transparent or translucent recording medium 29 such as a piece of carbon paper superimposed on a recording sheet. The cap 28 is provided with a channel 30 lower than the top of the cap 28 into which the recording balls 31 hereinafter described are adapted to fall after dropping upon the recording medium 29. Graduations are formed at the lower end of the body 23 just above the cap 28 to facilitate the setting of the cap in a desired position.

A rotating cap 32 is carried by the upper end of the body 23 and this cap 32 comprises a motor-carrying section 33 and a ratchet ring 34, the section 33 frictionally fitting upon the ring 34, as shown in Figure 4, and being removable from the ring 34, when desired. A suitable spring wound motor 35 is carried within the section 33 and a horizontal pinion 36 is carried by the motor 35 and extends below the section 33. This pinion 36 meshes with a horizontal pinion 37 fixed to a vertical shaft 38 which it fixed to either or both of the members 39 and 40. A magazine block 39 is fitted in the upper end of the body 23 and supports a disc 40, which disc 40 fits snugly between the upper face of the block 39 and the under face of the ring 34. The disc 40 and block 39 are fixed relative to each other in any suitable manner. The ring 34 is caused to revolve when the motor rotates relative to the gear 37, which gear 37 is also fixed to the shaft 38. The block 39 is provided with a central ball outlet 41 at its lower end, and this outlet 41 communicates with a downwardly and centrally inclined channel 42, the upper end of the channel 42 communicating with a vertical channel 43 formed in the disc 40. The ring 34 is provided with an integral central journal portion 44 through which the vertical shaft 38 extends. This journal portion 44 carries a ball-bearing assembly 45 upon its lower face for contact with the upper face of the disc 40, and the upper end of the spring-pressed needle-actuating rod 46 hereinafter described. A series of ball-receiving sockets 47 are formed in the under face of the journal portion 44, and are preferably twelve in number. The ball-bearing assembly 45 carries the same number of balls 48 as there are sockets 47 in the journal portion 44, that is to say, twelve in number. The bottom face of the block 39 is provided with radiating channels 49 in which channels 49 are fitted ball-retaining needles 50 preferably five in number, the ends of which protrude slightly into the outlet 41, as shown in Figures 4 and 6. An ejection control needle 52 is also employed and constitutes the sixth needle. This needle 52 carries an enlarged sleeve 53 and the sleeve 53 is engaged by the wedge-shaped end 54 of the needle-actuating rod 46 so that when the ring 34 revolves upon the body 23, carrying the ball-bearing assembly 45, the balls 48, as shown in Figure 12, will depress the rod 46 as the balls 48 pass over the top of the rod 46. This movement of the rod 46 will cause the needle 52 to be drawn inwardly and allow a ball carried in the outlet 41 and supported by the inner ends of the needle 52 and needles of the fixed group to drop from the outlet 41, the balls 31 being of a size to be supported when the needle 52 extends into the outlet 41, and drop from the outlet 41 when that needle is withdrawn. The needles 50 project into the opening 58 to a point slightly less than the diameter of the ball 31. The needle 52, however, normally projects inwardly for a greater distance than the needles 50, so that this needle 52 will project inwardly of the circumference of the ball 31 and co-operate with needles of the fixed group to support the ball 31. When the needle 52 is withdrawn, however, beyond the circumference of the ball 31, the ball 31 may freely drop through the opening 58. A flat spring 55 normally holds the needle 52 in an extended position and this needle is moved to a retracted position by the depression of the rod 46 as the ball-bearings 48 contact the upper end of the rod 46. The block 39 and disc 40 are provided with a filling opening 56 leading to a point in the path of movement of the sockets 47. A needle-retaining plate 57 engages the under face of the block 39 to hold the needles 50 and 52 in place. This plate 57 is provided with a central aperture 58 which communicates with the outlet 41 and a suitable aperture registering with the filling opening 56. The plate 57 is inclined from its center toward the outer periphery to cause the balls to feed to the filling opening 56 while the device is inverted for filling.

A flat spring lever 59 is mounted to swing around the shaft 38, and extends at right angles thereto, through a radiating notch 60, and this lever 59 is adapted to engage the ratchet notches 61 formed along the lower edge of the ring 34 to rotate the cap 33 in a step-by-step movement and in a clockwise direction. The angular relation between the channel 42 and rod 46 is so arranged as to cause a ball to be dropped from the outlet 41 before another ball is fed to the channel 43.

The motor 35 is provided with the conventional switch or on-and-off control 62 to permit the motor 35 to be shut off when the section 33 is removed. A projecting stop-pin 63 is carried at a suitable location upon the ring 34, and this pin 63 is adapted to be engaged by a spring-pressed control lever 64 pivoted on member 23, to hold the cap 32 against clockwise rotation under the power of the motor 35, which motor 35 is normally free to rotate. When the lever 64 is pulled toward the body 23 by the fingers of an operator to disengage the pin 63, the ring 34 under the power of the motor 35 will automatically rotate in a clockwise direction when the lever 59 is moved under the releasing boss 65 to move the lever 59 to a disengaging position with respect to the ratchet notches 61. When the motor 35 is in operation, the cap 32 is gripped by the hand of the operator to control the switch 62, thereby holding the cap 32 stationary and permitting the ring 34 to freely rotate relative to the cap 32.

A reading device 66 is carried by the lower end of the hanger 12, and extends under the lower end of the cap 28 to allow an operator to view the recordings made upon the recording medium 29. This reading device is merely a thick transparent disc 67 having centering guide lines 68 on the top surface and on the bottom surface transversely of the recording device and transversely of the sextant.

A prism 69, as shown in Figures 1 and 2, may be supported at the outer end of the sighting tube 14 in a desired manner to permit an observer to observe objects below the horizontal plane of the sighting tube 14.

The operation of the device is as follows:

The handle 16 is gripped in the hand of the operator and an object to be observed (the sun, moon or star) is sighted through the tube 14. When the object is properly sighted the operator releases the lever 64 from the pin 63 if an automatic recording is desired after first moving the lever 59 to a disengaging position with respect to the ratchet notches 61. The body 23 and hanger 13 are mounted to freely swing on the shaft 11 under the pull of gravity and the hanger 12 may be freely swung to lock the same in a set adjusted position upon the arc 10 by means of the micrometer screw 17 for the purpose of reading. The hanger 13 is initially held in a set position by the spring-pressed brake shoe lever 18 and is afterwards positively locked by the plunger 20 before making the recording of the observation. Since the recording device A is carried by the hanger 13, the recording device A will, if the brake and lock are released, swing by gravity pull to a vertical position, and when the lever 64 is released the cap 33 will automatically rotate in a clockwise direction to periodically drop the balls 48 upon the recording medium 29, and thereby record the degree of error at which the range finder was held during the period of observation, in this way permitting the operator to properly and accurately, in conjunction with the reading on the arc 10, determine the altitude or inclination angle of the observed object at his location while making the observation. The reading of the recording medium 29 is obtained by moving the reading device 66 in line with the cap 28 and sighting through the transparent disc 67, the cap 28 and recording medium 29, the window 27 admitting sufficient light into the hollow body 23. The impact of the ball 48 upon the carbon sheet will cause a mark to be made upon the recording sheet, and this mark will be apparent to the eye when looking through the disc 67, cap 28 and recording medium. If the instrument is held in a true vertical, the ball which is dropped within the casing will strike the center of the recording unit, but if the hanger 13 is tilted at an angle to the vertical, the ball when dropped during observation will record the angle of tilt, which angle must be computed and subtracted from the altitude angle measured on the instrument to determine the true angle measured from a true vertical or the horizontal plane of the object observed.

The operation of the ball-dropping mechanism is as follows:

I provide twelve sockets 47 and ten dropping balls 48, and the channels 43 and 56 are properly located to permit the sockets 47 to be filled by the balls 48 passing through the channel or filling opening 56 when the angle-recording device A is inverted and the cap 33 is rotated, the spring lever 59 acting as a pawl upon the ratchet 61. As the sockets 47 register with the channel 56, balls 31 will drop into the sockets 47, and the cap 33 is rotated by the operator until the balls 31 are all in proper place when the device A is returned to an operative upright position. The cap 33 may be automatically rotated for automatically dropping the balls 31 in timed relation upon the recording medium 29, or the cap 33 may be rotated by hand in step-by-step rotation by swinging the lever 59 a distance of one notch at a time. The rotation of the cap 33 will cause the bearings 48 to periodically depress the plunger 46 and periodically withdraw the needle 52 and release a ball from the outlet 41, after which another ball is deposited in the oultet 41 from the channel 42 and one of the sockets 47.

It should be noted that the device is timed to drop ten balls over a selected interval of time (such as ten balls in ten seconds), and the mean is five seconds after the first ball falls. The time required for the ball to fall upon the recording device after being released is known because of the distance of fall. The observer may then measure the position of the cluster of recordings made on the recording device. The lines 68 of the disc 67 are brought into superimposed relation relative to each other when reading the recordings. Then the reading device 66 is moved by the micrometer 17 until the lines 68 register with the center of a selected recording (dot) or a pattern of recordings (dots). Then the degree on the arc 10 is read and the minutes on the micrometer drum of the screw 17 are read giving the observer a substantially correct angle of observation at the mean time of observation and also indicating the angle of tilt. For instance, note Figure 17, illustrating in diagram the lines 68 formed on the upper and lower faces of the disc 67. Also note Figure 16 which illustrates a recorded dot on the recording device. By bringing the lines 68 in superimposed relation relative to the line X, the angle of line X may be determined. Then by rotating the recording device or cap to bring the line Y in registration with the lines 68, the angle of line Y may be determined. In like manner by bringing the line Z in registration with the lines 68, the angle of line Z may be measured. The radius of the dot W which is a perfect circle, may also be measured by moving lines 68 of the reading device across the diameter of the dot. In actual measurement with the parts illustrated, it has been found that the diameter of the dot on the recording device measured twelve minutes of arc. It should be understood that the distance of the dot W from the cross lines shown in Figure 16, as well as the distance of the dot from the point of intersection of said lines, may be determined and the relative variance of the position of the dot with respect to the point of intersection and the cross lines may be observed by comparing lines X, Y and Z, in the manner above described.

The instrument is braced at three points to stabilize observation. The sighting tube rests against the head of the observer, and the instrument is gripped by the right hand about the recording device A, with the left hand gripping the handle 16. The position of the instrument is varied by movement of the head of the observer. The lugs 15 on the sighting tube may be placed against the sight of a gun or against any abutment which is parallel with the center of the bore of a gun to properly measure the angle of elevation of the gun with respect to the sighting device to check the sighting device.

By means of the recording device wherein a series of recording (dots) are made on a recording device, a series of angles of observation may be made over a given period of time to determine the rate of change of angle of moving objects relative to the observer or vice versa.

The instrument illustrated and described in this application is adapted to be used in substantially the same manner as a sextant, but the present instrument is constructed in such a manner as to measure an angle within an arc of 180°. This instrument may be, if so desired, attached to a sextant or octant in any conventional manner for the purpose of furnishing an artificial horizon, from which an angle of elevation may be measured.

Having described the invention, what I claim as new is:

1. An angle-measuring device comprising a carrier, a sight tube fixed on said carrier, a measuring arc fixed on said carrier and having its axis normal to the optical axis of said tube, a hanger pendulously pivoted on said carrier on an axis coincident with the axis of said arc, means on said hanger for recording the true vertical at the time of an observation, a second hanger pivoted on an axis coincident with the axis of said arc, and having indicating means readable on said arc, and a reading device also carried by said second hanger and having indicating means movable into registration with a record made by said recording means.

2. An angle-measuring device comprising a sight tube, a measuring arc fixed relative to said sight tube and having its axis normal to the optical axis of said tube, a hanger pendulously pivoted relative to said tube on an axis coincident with the axis of said arc, means on said hanger for recording the true zenith at the time of an observation, a second hanger pivoted on an axis coincident with the axis of said arc, and having indicating means readable on said arc, and a reading device also carried by said second hanger and having indicating means movable into registration with a record made by said recording means.

3. An angle-measuring device comprising a sight tube, a measuring arc fixed relative to said sight tube and having its axis normal to the optical axis of said tube, a hanger pendulously pivoted relative to said tube on an axis coincident with the axis of said arc, means on said hanger for recording the true vertical at the time of an observation, a second hanger pivoted on an axis coincident with the axis of said arc, and having indicating means readable on said arc, a reading device also carried by said second hanger and having indicating means movable into registration with a record made by said recording means, and means for selectively holding said hanger in a set position relative to said measuring arc.

4. An angle-measuring device comprising a sight tube, a measuring arc fixed relative to said sight tube and having its axis normal to the optical axis of said tube, a hanger pendulously pivoted relative to said tube on an axis coincident with the axis of said arc, means on said hanger for recording the true vertical at the time of an observation, a second hanger pivoted on an axis coincident with the axis of said arc, and having indicating means readable on said arc, a reading device also carried by said second hanger and having indicating means movable into registration with a record made by said recording means, initial holding means for selectively holding said hanger in a set position relative to said measuring arc, and positive locking means for fixing the hanger in a selected position relative to said measuring arc.

5. An angle-measuring device comprising a carrier, a sighting tube fixed on said carrier, a measuring arc fixed on said carrier and having its axis normal to the optical axis of said tube, a hanger pendulously pivoted on said carrier on an axis coincident with the axis of said arc, recording means on said hanger for recording the true vertical at the time of an observation, and a reading and measuring device suspended from the carrier for observing and measuring the record made on the recording means at the time of observation relative to a selected point on said recording means.

FREDERICK H. HAGNER.